United States Patent
Ruettinger et al.

(10) Patent No.: US 6,790,432 B2
(45) Date of Patent: Sep. 14, 2004

(54) SUPPRESSION OF METHANATION ACTIVITY OF PLATINUM GROUP METAL WATER-GAS SHIFT CATALYSTS

(75) Inventors: Wolfgang F. Ruettinger, East Windsor, NJ (US); Robert J. Farrauto, Princeton, NJ (US)

(73) Assignee: Engelhard Corporation, Iselin, NJ (US)

( * ) Notice: Subject to any disclaimer, the term of this patent is extended or adjusted under 35 U.S.C. 154(b) by 226 days.

(21) Appl. No.: 10/170,079

(22) Filed: Jun. 12, 2002

(65) Prior Publication Data

US 2003/0230029 A1 Dec. 18, 2003

(51) Int. Cl.[7] .............................................. C01B 3/16
(52) U.S. Cl. ........................................................ 423/656
(58) Field of Search .................................. 423/655, 656

(56) References Cited

U.S. PATENT DOCUMENTS

| | | | |
|---|---|---|---|
| 3,111,396 A | 11/1963 | Ball et al. ................... 264/628 |
| 6,455,182 B1 * | 9/2002 | Silver ........................ 423/656 |
| 6,524,550 B1 * | 2/2003 | Chintawar et al. .......... 423/656 |
| 6,555,088 B1 * | 4/2003 | Baumann et al. ........... 423/656 |
| 6,562,315 B2 * | 5/2003 | Korotkikh et al. .......... 423/656 |
| 6,652,830 B2 * | 11/2003 | Wang et al. ................ 423/656 |
| 6,723,298 B1 * | 4/2004 | Baumann et al. ........... 423/656 |

FOREIGN PATENT DOCUMENTS

| | | |
|---|---|---|
| DE | 100 10 007 A1 | 12/2000 |
| EP | 1 161 991 A1 | 3/2000 |
| EP | 1 046 612 A1 | 4/2000 |
| EP | 1 136 441 A2 | 3/2001 |
| EP | 1 136 442 A2 | 3/2001 |

* cited by examiner

Primary Examiner—Wayne A. Langel
(74) Attorney, Agent, or Firm—Russell G. Lindenfeldar (57) ABSTRACT

Provided is a method and apparatus for producing hydrogen from an input gas stream containing carbon monoxide and steam that includes contacting the input gas stream with a catalyst. The catalyst contains an inorganic oxide support; a platinum group metal dispersed on the inorganic oxide support; and a methane suppressing dispersed on the inorganic oxide support. The methane suppressing component is selected from the group consisting of oxides of tin, oxides of gallium and combinations thereof. Also provided are preferred catalyst preparations.

17 Claims, 5 Drawing Sheets

SUPPRESSION OF METHANATION ACTIVITY OF PLATINUM GROUP METAL WATER-GAS SHIFT CATALYSTS

The present invention relates to a method for conducting the water-gas shift reaction with platinum group metal-based water gas shift catalysts that include a methane suppressing component selected from oxides of tin or gallium. The inclusion of the methane suppressing component in the catalyst composition prevents or reduces the formation of methane that is often observed on treatment of carbon monoxide in hydrogen-containing gas stream. The present invention also relates to methods for the use of these catalysts for generating hydrogen by reaction of carbon monoxide (CO) and steam (gaseous $H_2O$), and in particular to generating hydrogen from a gas stream comprising hydrogen, water, and carbon monoxide. The catalysts and methods of the invention are useful, for example, in generating hydrogen in the gas stream supplied to fuel cells, particularly to proton exchange membrane (PEM) fuel cells.

Fuel cells directly convert chemical energy into electricity thereby eliminating the mechanical process steps that limit thermodynamic efficiency, and have been proposed as a power source for many applications. The fuel cell can be two to three times as efficient as the internal combustion engine with little, if any, emission of primary pollutants such as carbon monoxide, hydrocarbons and nitric oxides. Fuel cell-powered vehicles which reform hydrocarbons to power the fuel cell generate less carbon dioxide (green house gas) and have enhanced fuel efficiency.

Fuel cells, including PEM fuel cells [also called solid polymer electrolyte or (SPE) fuel cells], generate electrical power in a chemical reaction between a reducing agent (hydrogen) and an oxidizing agent (oxygen) which are fed to the fuel cells. A PEM fuel cell includes an anode and a cathode separated by a membrane which is usually an ion exchange resin membrane. The anode and cathode electrodes are typically constructed from finely divided carbon particles, catalytic particles supported on the carbon particles and proton conductive resin intermingled with the catalytic and carbon particles. In typical PEM fuel cell operation, hydrogen gas is electrolytically oxidized to hydrogen ions at the anode composed of platinum reaction catalysts deposited on a conductive carbon electrode. The protons pass through the ion exchange resin membrane, which can be a fluoropolymer of sulfonic acid called a proton exchange membrane. $H_2O$ is produced when protons then combine with oxygen that has been electrolytically reduced at the cathode. The electrons flow through an external circuit in this process to do work, creating an electrical potential across the electrodes. Examples of membrane electrode assemblies and fuel cells are described in U.S. Pat. No. 5,272,017.

Fuel cell processors (also known as fuel cell reformers) supply a hydrogen-containing gas stream to the fuel cell. Fuel cell processors include reactors that steam reform hydrocarbon feedstocks (e.g., natural gas, LPG) and hydrocarbon derivatives (e.g., alcohols) to produce a process stream enriched in hydrogen. Other by-products from the steam reforming of hydrocarbon include carbon monoxide and carbon dioxide. For example, methane is converted to hydrogen, carbon monoxide and carbon dioxide by the two reactions below:

$$CH_4 + H_2O \rightarrow 3H_2 + CO$$

$$CH_4 + 2H_2O \rightarrow 4H_2 + CO_2$$

The resulting gas is then reacted in the water-gas shift reactor where the process stream is further enriched in hydrogen by reaction of carbon monoxide with steam in the water-gas shift reaction:

$$CO + H_2O \rightleftarrows CO_2 + H_2$$

In fuel cell processors, the reaction is often conducted in two stages for purposes of heat management and to minimize the outlet CO concentration. The first of two stages is optimized for reaction at higher temperatures (about 350° C.) and is typically conducted using catalysts based on combinations of iron oxide with chromia. The second stage is conducted at lower temperatures (about 200° C.) and is typically conducted using catalysts based on mixtures of copper and zinc materials.

Other catalysts that can be used to conduct the water-gas shift reaction include platinum-based catalysts such as platinum on an alumina support or platinum on a cerium oxide support. While effective at producing hydrogen using the water-gas shift reaction when operated at temperatures above about 300° C., water-gas shift reaction catalysts also cause the formation of methane ($CH_4$) by catalyzing the reaction of CO with hydrogen as shown below:

$$CO + 3H_2 \rightarrow CH_4 + H_2O.$$

This undesired side reaction sacrifices three moles of hydrogen for each mole of carbon monoxide converted to methane. Methanation can also occur under these conditions with carbon dioxide according to the equation shown below:

$$CO_2 + 4H_2 \rightarrow CH_4 + 2H_2O.$$

In this side reaction four moles of hydrogen are consumed for each mole of carbon dioxide converted to methane. The production of methane during the water gas shift reaction (referred to herein as "methanation") is a side reaction that consumes hydrogen gas in an exothermic reaction to ultimately reduce the hydrogen yield from the water gas shift reaction. Moreover, the methanation reactions accelerate with increasing catalyst bed temperatures. This property presents a liability, as the exothermic reaction can result in a runaway reaction with carbon dioxide, in addition to carbon monoxide, being methanated. Major hydrogen loss can occur and the catalyst can be damaged by high temperatures. In addition, methane is a greenhouse gas. The fuel cell is advertised as an emission-free energy producer, and release of methane is undesirable. Methane is difficult to combust during normal operating conditions of the fuel cell, so producing an appreciable quantity of methane is environmentally unfavorable.

SUMMARY OF THE INVENTION

In one embodiment, the invention relates to a method of producing hydrogen from an input gas stream containing carbon monoxide and steam. The method includes contacting the input gas stream with a catalyst that contains: an inorganic oxide support; a platinum group metal dispersed on the inorganic oxide support; and a methane suppressing component. The methane suppressing component is selected from the group consisting of oxides of tin, oxides of gallium and combinations thereof. The methane suppressing component is also dispersed on the inorganic oxide support.

The platinum group metal used in the method is selected from the group consisting of platinum, palladium, rhodium, ruthenium and iridium. Preferably, there is from about 0.1 to 10 wt. % of the platinum group metal dispersed on the inorganic oxide support. A preferred platinum group metal is platinum.

The inorganic oxide support of the catalyst is selected from the group consisting of alumina, zirconia, titania, silica, oxides of rare earth metals and combinations thereof. The rare earth metals are selected from the group consisting of the lanthanides and yttrium.

One preferred inorganic oxide support is formed from a composite of zirconia and oxides of one or more rare earth metals. A particularly preferred support is formed from a composite of cerium oxide and zirconia.

Another preferred inorganic oxide support used in the method contains alumina impregnated with one or more oxides of rare earth metals selected from the group consisting of the lanthanides and yttrium. More preferably, the method uses a catalyst that has a support composed of alumina impregnated with both zirconia and one or more oxides of rare earth metals.

The catalyst used in the method is preferably in the form of a washcoat composition deposited on a substrate. Preferably, the substrate is a honeycomb monolith.

In a preferred embodiment of the method, the input gas stream is contacted with a catalyst having: a cerium oxide-zirconia support; about 0.01 to 10 wt. % of platinum dispersed on the cerium oxide-zirconia support; and about 0.01 to 5 wt % of oxides of tin dispersed on the cerium oxide-zirconia support. In particularly preferred embodiments, there is about 1 to 5 wt. % platinum dispersed on the cerium oxide-zirconia support; and about 0.1 to 2 wt. % of oxides of tin dispersed on the cerium oxide-zirconia support.

In another aspect, the invention relates to an apparatus for supplying hydrogen to a fuel cell with a hydrocarbon reformer reactor, a selective carbon monoxide oxidation reactor and a water-gas shift reactor having a water-gas shift catalyst. In the apparatus, the water-gas shift catalyst has an inorganic oxide support and a methane suppressing component selected from the group consisting of oxides of gallium, oxides of tin and combinations thereof. The methane suppressing component is also dispersed on the inorganic oxide support. The hydrocarbon reformer reactor is upstream and in train with the water-gas shift reactor, and the preferential oxidation catalyst is downstream and in train with the water-gas shift reactor. Preferably, the support is a cerium oxide-zirconia composite.

In another aspect, the invention relates to a method of preparing a catalyst having an inorganic oxide support, a platinum group metal dispersed on the inorganic oxide support, and oxides of tin dispersed on the inorganic oxide support. The method includes the steps of:
  a) suspending the inorganic oxide support in an aqueous solvent at a pH below 3 to form a first aqueous suspension;
  b) adding tin powder to the first aqueous suspension to form a second aqueous suspension;
  c) adjusting the pH of the second suspension to a pH of at least 8 by adding base;
  d) collecting the suspended particles from the product of step c; and
  e) drying and calcining the precipitate.

In a preferred embodiment of the method, the first aqueous suspension contains a platinum group metal salt, preferably a platinum salt. In this method, preferred inorganic oxide supports contain rare earth metals such as cerium oxide-zirconia composites.

Definitions

The definitions of certain terms used herein are as follows:

"aqueous solvent" shall include solutions containing water and water-miscible organic solvents. Preferably the volume of water is at least 50% of the total volume.

"BET surface area" means the Brunauer, Emmett, Teller method for determining surface area by $N_2$ adsorption. Unless otherwise specifically stated, all references herein to the surface area refer to the BET surface area.

"cerium oxide" includes all oxides of cerium including ceria ($CeO_2$).

"incipient wetness impregnation" means the impregnation of the catalyst support with a volume of metal salt solution substantially equal to the pore volume of the support material.

"inorganic oxide supports" refer to particulate support materials that are preferably composed of alumina, zirconia, titania, silica and rare earth metal oxides. In addition, particulate composite materials that are formed from mixtures of these compounds are included, e.g., zirconia-cerium oxide.

"inlet temperature" shall mean the temperature of test gas, fluid sample or fluid stream being treated immediately prior to initial contact of the test gas, fluid sample or fluid stream with a catalyst composition.

"input gas stream" means a gas stream prior to passing through a catalytic region or prior to initial contact with a catalyst composition. In fuel cell applications, the input gas stream is typically the gas stream received from the hydrocarbons or hydrocarbon derivatives.

"monolith substrates" refer to structures prepared from refractory materials (e.g., metallic, ceramic) upon which washcoat compositions are deposited. The term shall include substrates of the honeycomb type, heat exchangers and foams.

"percent by volume" refers to the amount of a particular gas component of a gas stream, unless otherwise indicated, means the mole percent of the gas component of the gas stream as expressed as a volume percent.

"platinum group metal-based catalyst" refers to a catalyst that includes a platinum group metal as a catalytic agent. Platinum group metals include platinum, palladium, rhodium, ruthenium and iridium.

"rare earth metal oxides" shall refer to the oxides of the metals of the lanthanide series (e.g., oxides of lanthanum, cerium, praseodymium, neodymium and the like) and yttrium.

"VHSV" means volume hourly space velocity; that is, the flow of a reactant gas in liter per hour per liter of catalyst volume at standard temperature and pressure. In embodiments of the invention that include a monolith substrate, the determination includes the volume of the monolith substrate.

"WHSV" means weight hourly space velocity; that is the flow of a reactant gas in liter per hour per kilogram of catalyst.

"wt. %." or "percent by weight", means weight percent based on the weight of an analyte as a percentage of the total catalyst weight, including the support and any material impregnated therein. The wt. % of the platinum group metal component is calculated on the basis of the atomic weight of platinum group metal. The wt. % of the oxides of tin are calculated on the basis of the formula weight of $SnO_2$. The calculation does not include the monolith substrate in embodiments where the catalyst is in the form of a washcoat composition deposited on a monolith substrate.

DETAILED DESCRIPTION OF THE INVENTION

In accordance with the invention, Applicants have found methods for conducting the water-gas shift reaction to produce hydrogen from carbon monoxide and steam using platinum group metal-based catalysts. The methods of the invention significantly decrease the formation of methane that often accompanies the water-gas shift reaction catalyzed by platinum group metal-based catalysts at temperatures above 300° C. As a result of the decreased formation of methane, the hydrogen yield for the water-gas shift reaction is improved over processes conducted under similar conditions with conventional platinum metal-based catalysts.

The catalysts of the invention include one or more platinum group metals as catalytic agents and a methane suppressing component that is an oxide of tin, gallium, or a mixture thereof dispersed on an inorganic oxide support. The catalysts can be in the form of extrudates, tablets, or washcoat compositions deposited on substrates. Preferred forms of the catalysts are as washcoat compositions deposited on monolith substrates.

The platinum group metals useful in the composition include one or more of platinum, palladium, rhodium, ruthenium and iridium. A preferred platinum group metal is platinum. Typically, there is at least 0.1 wt. % of the platinum group metal in the catalyst composition. Preferably, there is about 0.1 to 10 wt. %, and more preferably about 0.5 to 5 wt. % of the platinum group metal in the catalyst composition.

The methane suppressing component is selected from the oxides of tin, gallium, or a mixture thereof, with the oxides of tin being particularly preferred. Typically, there is about 0.1 to 15 wt. % of the oxides of tin (calculated based on the basis of the formula weight of $SnO_2$) when present in the catalyst composition. Preferably, there is from 0.1 to 5 wt. % of the oxides of tin in the composition. The oxides of tin shall include tin (II) oxide and tin (IV) oxide. When the oxides of gallium are used they are typically present from about 0.1 to 5 wt. % in the catalyst composition.

Useful inorganic oxide supports include high surface area inorganic oxide supports. These inorganic oxide supports include, for example, activated alumina, zirconia, titania, silica and rare earth metal oxides. Other useful supports include combinations of these inorganic oxides. Preferably, the inorganic oxide support has a specific surface area of at least 10 m$^2$/g. More preferably, the inorganic oxide support has a specific surface area of at least 50 m$^2$/g.

In another preferred embodiment, composites of rare earth metal oxides and zirconia are used as catalyst supports. For example, composites of cerium oxide-zirconia form a particularly useful catalyst support. In these type of composite materials, it is believed that the zirconia acts as a stabilizer for the rare earth metal oxide support, although in some cases, the zirconia may also serve to promote the water-gas shift reaction. Typically, the zirconia component may comprise up to about 80 wt. % of the catalyst support.

A particularly preferred rare earth metal oxide-zirconia composite is a co-precipitated cerium oxide-zirconia composite. There is preferably up to 40 weight percent cerium oxide and at least 50 weight percent zirconia.

In another preferred embodiment, the inorganic oxide support is composed of alumina impregnated with rare earth metal oxides, such as alumina impregnated with cerium oxide. This support is formed from alumina which preferably includes the members of the gamma or activated alumina family, such as gamma and eta aluminas, and, if present, a minor amount of other inorganic oxides, e.g., up to about 20 wt. % of silica, zirconia and titania. The alumina can be impregnated with the rare earth metal oxide by first contacting the support with a water-soluble or water-dispersible salt of the rare earth metal for sufficient time to impregnate the support. For example, cerium nitrate can be used to impregnate the alumina. The supported rare earth metal is then calcined to fix it to the alumina as an oxide. Preferably, the amount of the rare earth metal salt is chosen so that the final concentration of the rare earth metal oxide on the support is about 10 wt. % to about 40 wt. %.

In an alternative preferred embodiment, the inorganic oxide support is composed of alumina impregnated with both zirconia and one or more rare earth metal oxides. The alumina can be impregnated with the rare earth metal oxide by first contacting the support with water-soluble or water-dispersible salts of the zirconium (e.g., zirconium acetate) and the rare earth metal (e.g., cerium nitrate) for sufficient time to impregnate the support. Similar to the embodiment above, the supported zirconium and rare earth metal is then calcined to fix them to the alumina as oxides. Preferably, the amount of zirconium salt is chosen so that the final concentration of the zirconia on the support is about 5 wt. % to 40 wt. % and the amount of the rare earth metal salt is chosen so that the final concentration of the rare earth metal oxide on the support is about 1 wt. % to 10 wt. %.

For all embodiments, the catalyst is preferably formed by dispersing the platinum group metal and methane suppressing component on the inorganic oxide support. The platinum group metal is preferably dispersed on the inorganic oxide support by contacting the inorganic oxide support with a water-soluble or water-dispersible salt of the platinum group metal for sufficient time to impregnate the inorganic oxide support, followed by a drying step. The impregnation can be accomplished using incipient wetness impregnation wherein minimal volumes of platinum salt solutions are employed to soak the inorganic oxide support. In other embodiments, the impregnation can be achieved by use of larger proportions of platinum group metal salt solutions. Useful platinum group metal salts include, but are not limited to, platinum nitrate, amine-solubilized platinum hydroxide, palladium nitrate, palladium acetate and ruthenium nitrate. The support material containing the platinum group metal component can be calcined to form the platinum group metal, preferably at a temperature above about 450° C.

Methods of dispersing the oxides of tin on the rare earth metal oxide support preferably include those that achieve a substantially uniform coverage of the support and maintain the carbon monoxide conversion activity of the catalyst. Uniform coverage of the support with the tin oxide, provides sufficient physical contact of the oxides of tin with the platinum group metal component. While not being bound by theory, Applicants believe that physical contact of the oxides of tin and platinum group metal components ensures reduced production of methane that would otherwise accompany the water-gas shift reaction catalyzed by platinum group metal catalysts.

A preferred method for the incorporation of the oxides of tin on the inorganic oxide support includes the steps of adding tin powder to an aqueous suspension of the support having a pH below 3 (preferably below 2); raising the pH of the resulting suspension to a pH of about 8 using a base, e.g., ammonium hydroxide; and collecting the suspended particles. The suspended particles are then dried and calcined, preferably above about 450° C. The tin oxide is typically dispersed on the inorganic oxide support following the impregnation of the platinum group metal on to the support.

When the oxides of gallium are used they are typically dispersed on the inorganic oxide support by contacting the inorganic oxide support with a water-soluble or water-dispersible salt of the gallium, e.g., gallium nitrate for sufficient time to impregnate the inorganic oxide support, followed by drying and calcination steps.

Washcoat compositions, extrudates and tablets of the catalyst are preferably formed from powdered supports containing the platinum group metal and the methane suppressing component.

In embodiments of the invention wherein the catalyst is in the form of extrudates, the calcined, powdered inorganic oxide support having the platinum group metal and the methane suppressing component is typically mixed with a binder and extruded through a die of the desired shape. Alternatively, a mixture of the inorganic oxide support and binder can be extruded and then impregnated with the platinum group metal and methane suppressing component. Typical useful binders include hydrated forms of alumina (e.g., pseudoboehmite), silica binders, clay binders, zirconia binders and the like.

Tablets can be prepared by: (1) combining the calcined, powdered oxide support with a binder; (2) shaping the combined powder and binder into the desired shape which could include tablets, pellets, beads, cylinders or hollow cylinders; and (3) calcining the shaped catalyst. The support can be impregnated with the platinum group metal and the methane suppressing component before or after the tablet shaping steps.

Washcoat compositions (or "slurries") of the catalyst for deposition on substrates are prepared using methods known in the art. Preferably, the impregnated inorganic oxide support is ball milled as a suspension using sufficient water to prepare a slurry of a desired concentration. The concentration of the solids in the washcoat slurry can be used as a method to control the thickness of the catalyst coating ultimately deposited on the substrate. For example, increasing the weight percentage of solids in the aqueous slurry will result in a thicker catalytic coat.

It is also generally advantageous to prepare slurries having particles of small particle sizes, e.g., less than 10 μm, to anchor the catalyst on the substrate. Therefore, the particle size distribution of the slurry is typically measured, and milling is continued until the desired particle size has been achieved. Here again, binders such as hydrated forms of alumina, e.g., pseudoboehmite, are optionally included in the slurries to improve adherence of the washcoat to the substrate walls.

The washcoat slurries are deposited on the substrates by methods well-known to those of ordinary skill. Thus, for example, in a typical honeycomb substrate preparation, a layer of the supported platinum group metal-based catalyst can be prepared by dipping the substrate in a reservoir containing a sufficient volume of the slurry so that the substrate is fully immersed. The coated substrate can be subsequently dried and calcined.

As mentioned above, the washcoat catalyst compositions of the invention are disposed on substrates to form coated monolith substrates. Although a variety of substrates can be used, the substrate is preferably of the type with one or more monolithic bodies having a plurality of finely divided gas flow passages (channels) extending there through. Preferably, the monolith substrate is of the type having a plurality of fine, parallel gas flow passages extending across the longitudinal axis of the substrate from an inlet or an outlet face, so that the channels are open to fluid flow there through (often referred to as a "honeycomb substrate"). The passages, which are essentially straight from the inlet and outlet of the substrates, are defined by walls on which the catalyst composition can be coated in washcoat compositions so that the gases flowing through the passages contact the catalyst material.

Monolithic, honeycomb substrates are commercially available in various sizes and configurations. The flow passages of the monolithic substrate are thin-walled channels which can be of any suitable cross-sectional shape and size such as trapezoidal, rectangular, square, sinusoidal, hexagonal, oval, circular. Such monolithic substrates may contain up to about 700 or more flow channels ("cells") per square inch of cross section, although far fewer may be used. For example, the substrate can have from about 60 to 600, more usually from about 200 to 400 cells per square inch ("cpsi").

Various types of materials of construction for honeycomb substrates are known. The honeycomb substrate can be made from a variety of materials, including metal or ceramic materials. In some embodiments, the monolith substrate can be made from a ceramic porous material composed of one or more metal oxides, e.g., alumina, alumina-silica, alumina-silica-titania, mullite, cordierite, zirconia, zirconia-ceria, zirconia-spinel, zirconia-mullite, silicon-carbide, and the like. Some non-limiting examples of ceramic monoliths can include those made of: zirconium, barium titanate, porcelain, thorium oxide, magnesium oxide, steatite, boron or silicon carbonates, cordierite-alpha alumina, silicon nitride, spodumene, alumina-silica magnesia, zircon silicate, sillimanite, magnesium silicates, zircon, petalite, alpha alumina and aluminosilicates. One example of a commercially available material for use as the substrate for the present invention is cordierite, which is an alumina-magnesia-silica material.

The metallic monolith substrate can be a honeycomb substrate made of a refractory metal such as a stainless steel or other suitable iron based corrosion resistant alloys (e.g., iron-chromium alloy). Metal monoliths can be produced, for example, from alloys of chromium, aluminum and cobalt, such as those marketed under the trademark KANTHAL, or those produced from alloys of iron, chromium, aluminum and yttrium, marketed under the trademark of FECRALOY. The metal can also be carbon steel or simple cast iron. Monolith substrates are typically fabricated from such materials by placing a flat and a corrugated metal sheet one over the other and rolling the stacked sheets into a tubular configuration about an axis parallel to the configurations, to provide a cylindrical-shaped body having a plurality of fine, parallel gas flow passages, which can range, typically, from about 200 to about 1,200 per square inch of face area. Heat exchangers, which are typically formed from metallic materials, can also be used as the monolith structures.

In other embodiments, the substrate can be made of a ceramic or metal foam. Substrates in the form of foams are well known in the prior art, e.g., see U.S. Pat. No. 3,111,396, hereby incorporated by reference.

The invention also relates to processes for using the catalysts of the invention. In a preferred embodiment the catalysts of the invention can be used in processes for producing hydrogen via the water-gas shift reaction. For example, the catalyst of the invention can be incorporated in a reactor that is charged with an input gas stream containing carbon monoxide and steam to produce hydrogen and carbon dioxide as products in the output gas stream.

The composition of the input gas stream for the process can vary depending on the source of the reactant carbon monoxide. Although higher proportions of carbon monoxide can be accommodated in the process, the process of the invention is particularly effective wherein the carbon monoxide concentration is less than 10% by volume. Typically, molar excesses of steam are used relative to the amount of carbon monoxide introduced into the input gas stream. Generally, $H_2O$:CO molar ratios of between 1:1 (i.e., "1.0") and 20:1 (i.e. "20.0") are preferred in the input gas stream, with higher ratios being particularly preferred for high conversion of carbon monoxide.

In fuel cell applications of the inventive process, input gas streams typically contain at least 10% by volume of hydrogen in addition to the carbon monoxide and steam. Higher volumes, e.g., greater than 30–40% by volume, are often utilized in fuel cell applications. The input gas stream typically contains 10–25% by volume of carbon dioxide.

In addition to carbon monoxide, carbon dioxide, steam and hydrogen, the input gas stream can contain nitrogen, and minor amounts of olefins, alcohols, aldehydes and/or other hydrocarbons. Preferably, the input gas stream contains not more than 4–5% by volume of hydrocarbons.

A useful operating temperature of the water-gas shift process is about 150 to 450° C. A preferred operating range is from 250 to 400° C. The optimal temperature ranges for these catalysts make it an ideal candidate for incorporation into fuel processors reactors that serve as the "high-temperature" component in water-gas shift reactors. The platinum metal group-based catalyst may be used, for example, in place of high temperature iron-chromium based water-gas shift catalysts such as $Fe_2O_3/Cr_2O_3$ that typically operate at about 350° C.

Reaction zone pressure is preferably maintained below the dew point pressure of the reaction mixture. It should be recognized that lower or higher reaction zone pressures can be used, such as from atmospheric up to about 500 psig.

Preferably, the water-gas shift reaction process is carried out in a continuous mode with the reactants being passed over the catalyst contained in one or more reaction zones. Gaseous hourly space velocities of about 500 to about 50,000 $hr^{-1}$ VHSV measured on the basis of dry gas under standard conditions are particularly suitable for most fuel cell operations. In embodiments wherein the catalysts are in the form of washcoat compositions deposited on monolith substrates, space velocities of up to 100,000 $hr^{-1}$ VHSV may be possible. A preferred operating range for the catalysts of the invention in the form of washcoat compositions deposited on monolith substrates is from 10,000–50,000 VHSV. Those skilled in the art will recognize that lower gas reactant flow rates favor more complete CO conversion.

Although the water-gas shift catalysts and processes of the invention can be used in any application where hydrogen production is needed, a particularly useful application is in apparatus such as fuel processors that supply hydrogen to fuel cells. As discussed above, these systems typically comprise a series of reactors that convert hydrocarbon fuels (e.g., natural gas, gasoline, fuel oil, liquid petroleum gas, and the like) into hydrogen fuel. The conversions that take place in the reactors include reforming reactions and water gas shift reactions to produce hydrogen. Other reactors and trapping devices can also be included in the apparatus that reduce unwanted components in the hydrogen feed streams (e.g., carbon monoxide and sulfur components), that are ultimately supplied to the fuel cell.

Figure 1:
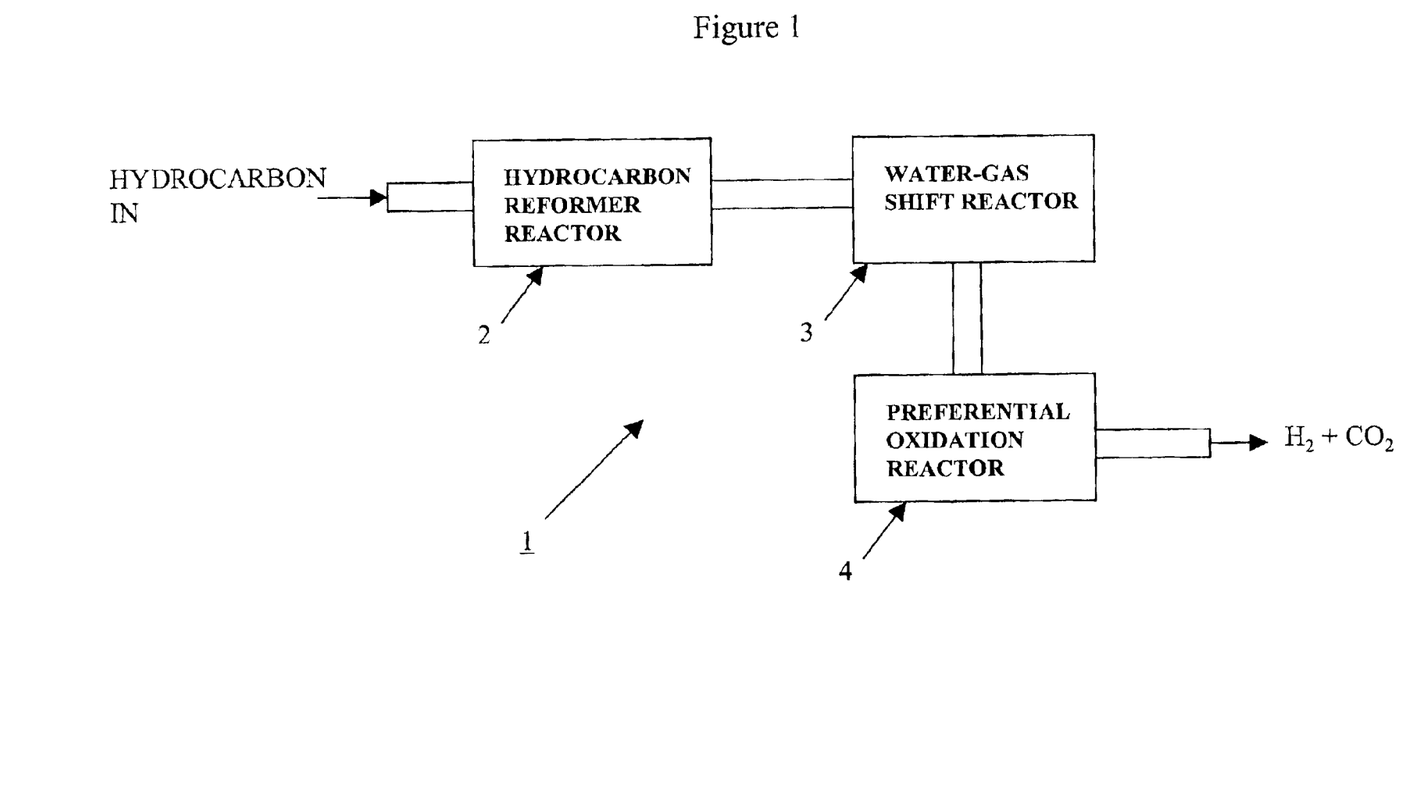
FIG. 1 is a depiction of one embodiment of fuel processor unit for supplying hydrogen to a fuel cell.

As illustrated in the fuel processor (1) of FIG. 1, the hydrocarbon reformer reactor (2) converts hydrocarbons (e.g., methane) and steam into hydrogen, carbon monoxide, and carbon dioxide. For example, methane is converted by the two reactions shown below:

$$CH_4+H_2O \rightarrow 3H_2+CO$$

$$CH_4+2H_2O \rightarrow 4H_2+CO_2$$

The resulting gas is then reacted in the water-gas shift reactor (3) to further enrich the process gas in hydrogen, through the reaction of carbon monoxide with steam. Residual carbon monoxide in the process is then removed by selective carbon monoxide oxidation (with minimal hydrogen consumption) to carbon dioxide in the preferential oxidation reactor (4) according to the reaction:

$$CO+\tfrac{1}{2}O_2 \rightarrow CO_2.$$

The resulting process stream comprising high levels of hydrogen is then supplied to the fuel cell.

The following examples further illustrate the present invention, but of course, should not be construed as in any way limiting its scope.

EXAMPLE 1

Preparation of Platinum-Based Catalysts on a Cerium Oxide Support with Varying Levels of Tin Oxide $CeO_2$ powder (5 g, HSA-15 from Rhodia) was suspended in water (25 mL). Nitric acid (20%) was added with stirring. Tin powder (325 mesh, 99.8% pure) was added to the slurry to give the desired weight percent loading of tin oxide (0.5%, 1% 2%, 5% or 7%). The resulting suspension was stirred for 30 min and then ammonium hydroxide (1:2 diluted with water) was added until the pH reached 9. The suspension was filtered, washed with water (50 mL), dried at 120° C. (8 h) and calcined at 500° C. (4 h). The resulting powders were impregnated with a platinum nitrate solution to incipient wetness, the solution containing enough platinum to result in a 2 wt. % loading of platinum in the final product. The powders were dried at 120° C. (8 h) and calcined at 500° C. (4 h).

The powdered catalysts prepared by the above procedure were designated as follows in Table 1:

TABLE 1

| Catalyst | wt. % of $SnO_2$ |
|---|---|
| Catalyst A | 0 wt. % |
| Catalyst B1 | 0.5 wt. % |
| Catalyst B2 | 1 wt. % |

TABLE 1-continued

| Catalyst | wt. % of SnO$_2$ |
|---|---|
| Catalyst B3 | 2 wt. % |
| Catalyst B4 | 5 wt. % |
| Catalyst B5 | 7 wt. % |

EXAMPLE 2

Catalyst Performance of Catalyst A, B1, B2 B3, B4 and B5

The following example illustrates the benefits obtained by impregnation of platinum group metal-based catalysts with tin oxide. The catalysts prepared in Example 1 were evaluated for their CO conversion activity and the amount of methane produced that accompanied the water-gas shift reaction.

Catalytic activities of the powders were measured by measuring 2 g of each of the catalyst powders in a quartz reactor. The reactant (input) gas had a dry gas composition of 3% CO, 15% CO$_2$, 48% H$_2$, and 34% N$_2$. Steam (26%) was added to the reactant gas. The reactant gas was passed over the catalyst at a dry flow-rate of 0.5 L/min (which corresponds to a WHSV of 20,000 h$^{-1}$ wet gas). The CO outlet concentration was monitored using a non-dispersive infrared (NDIR) analyzer (Model ZRF California Analytical Instruments); hydrocarbon concentration was measured using a Rosemount model 400A hydrocarbon analyzer. The results of the experiment are shown in Table 2. The T(50% conversion) is the temperature at which 50 percent of the carbon monoxide from the reactant gas stream is converted to CO$_2$.

TABLE 2

| Catalyst | wt. % of SnO$_2$ | T (50% conversion) | ppm CH$_4$ at 300° C. |
|---|---|---|---|
| Catalyst A | 0 wt. % | 221° C. | 100 ppm |
| Catalyst B1 | 0.5 wt. % | 240° C. | 25 ppm |
| Catalyst B2 | 1.0 wt. % | 240° C. | 36 ppm |
| Catalyst B3 | 2.0 wt. % | 250° C. | 8 ppm |
| Catalyst B4 | 5 wt. % | 240° C. | 8 ppm |
| Catalyst B5 | 7 wt. % | 246° C. | 1.5 ppm |

While trials using the comparative Catalyst A (prepared without tin) began to exhibit pronounced methane formation at 300° C., addition of increasing amounts of tin suppressed the formation of methane. For instance, in trials with Catalyst B5, containing 7 wt. % of SnO$_2$, only 1.5 ppm of methane was produced was at 300° C.

The inclusion of increasing amounts of tin in the catalyst composition prepared according to Example 1 resulted in a catalyst that exhibited a somewhat lower CO conversion activity relative to the comparative Catalyst A prepared without tin.

EXAMPLE 3

Preparation of Platinum-Based Catalysts on a Cerium Oxide Support with Tin Oxide Dispersed on the Support; Monolith Catalysts 100 g of coprecitated zirconia-cerium oxide composite material (containing 18% CeO$_2$ and 5% La$_2$O$_3$) was suspended in water (500 mL), and 18.26 g of platinum nitrate solution (containing 12.05 wt. % Pt) was added with stirring (The pH of the suspension was below 2 due to excess nitric acid in the reagent platinum nitrate solution). The stirred suspension was heated to 70° C. After 45 minutes the suspension was divided into two equal parts. In part one, the suspended particles were filtered, washed with water (500 mL), dried at 120° C. (8 h) and calcined at 500° C. (4 h).

Tin powder (0.2 g) was added to part two of the suspension. After 15 minutes of stirring, ammonium hydroxide (1:2 diluted with water) was added until the pH reached 9. The suspended particles were filtered, the powder washed with water (500 mL), dried at 120° C. (8 h) and calcined at 500° C. (4 h).

The two powders were used to coat 400 cpsi ceramic cylindrical monolith substrates having a diameter of 0.75 in and a length of 2 in. Each powder, a binder (3 wt. % alumina as pseudo-boehmite), water (to give 40 wt. % solids) and grinding media (carborundum balls) were added to a ball mill. The average particle size was reduced to <10 micron in the ball mill. The resulting slurry was coated onto the ceramic monoliths by dipping followed by drying at 120° C. for 2 h, and calcination at 400° C. for 2 h. Each of the catalysts contained a washcoat loading of 3 g/in$^3$. Each of the catalysts contained 2 wt. % of platinum and were designated as follows (Table 3)

TABLE 3

| Catalyst | wt. % of SnO$_2$ |
|---|---|
| Catalyst C | 0% |
| Catalyst D | 0.5% |

EXAMPLE 4

Catalyst Performance of Monolith Catalysts C and D

The following example shows the improved CO conversion activity of tin oxide-containing catalysts prepared according to Example 3.

Figure 2:
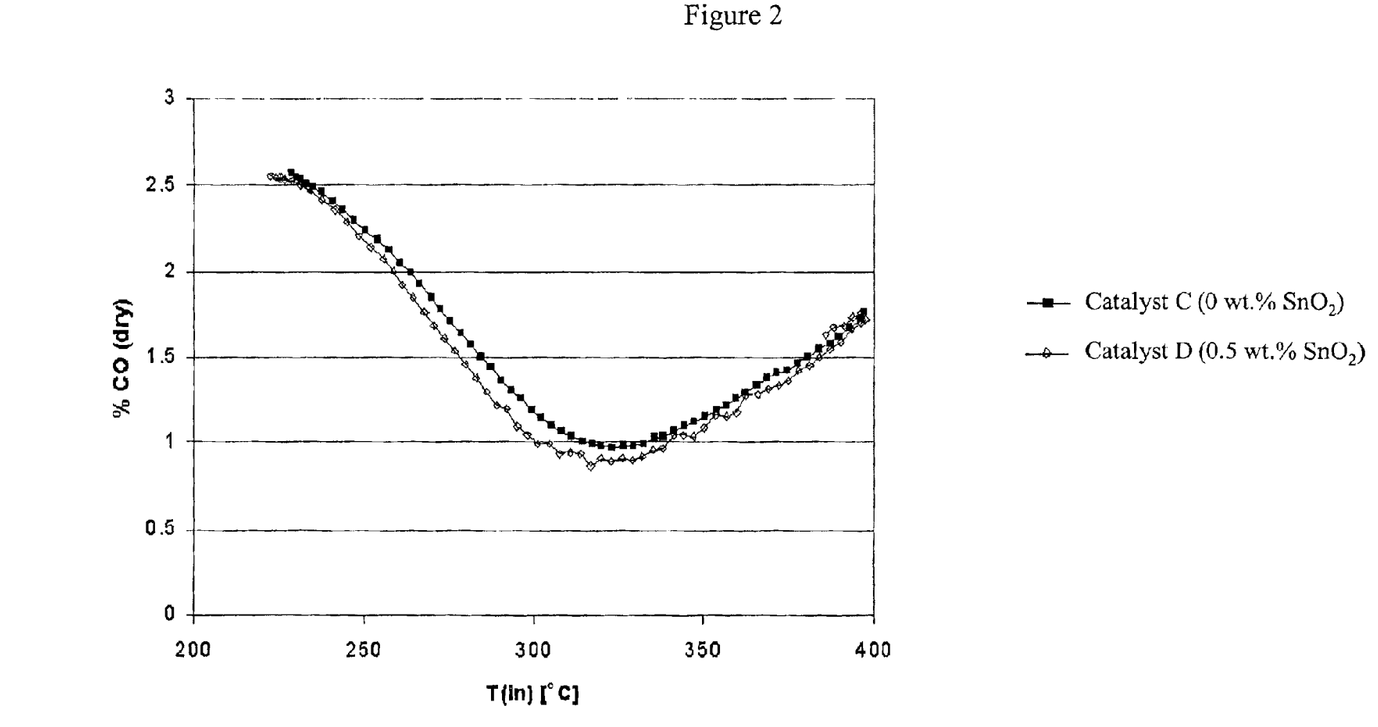
FIG. 2 is a graphical representation of the relationship of reaction temperature and catalytic activity for monolithic platinum-based catalysts.
Figure 3:
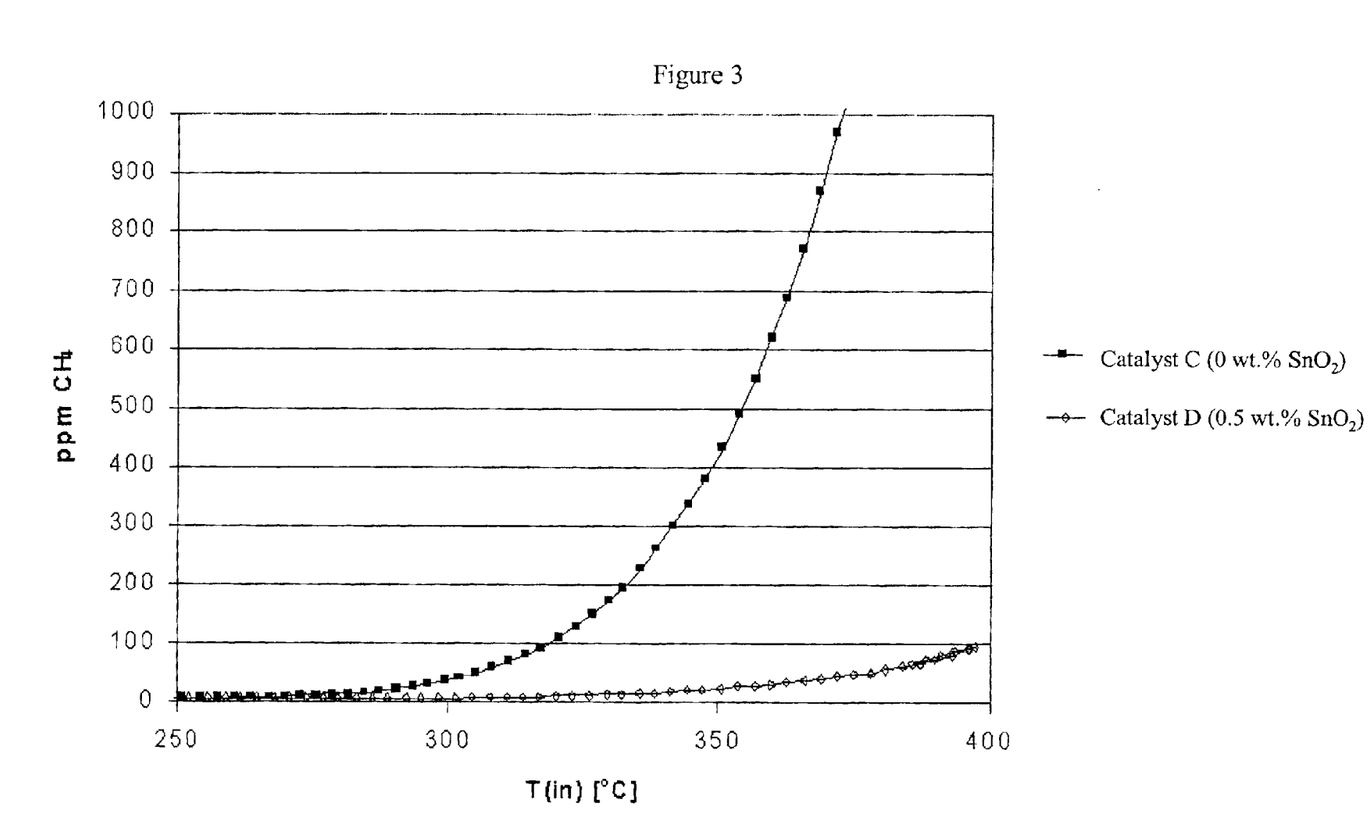
FIG. 3 is a graphical representation of the relationship of the amount of the reaction temperature and the methane produced and for monolithic platinum-based catalysts.

Segments (0.5 in) of each of the monolith catalysts of Example 3 were cut and mounted in 1" quartz tubes. The reactant (input) gas had a dry gas composition of 3% CO, 15% CO$_2$, 48% H$_2$, and 34% N$_2$. Steam (26%) was added to the reactant gas. The reactant gas was passed over the catalyst at a dry flow-rate of 0.5 L/min. (This corresponds to a VHSV of 11,200 h$^{-1}$). The CO outlet concentration was monitored using a non-dispersive infrared (NDIR) analyzer (Model ZRF California Analytical Instruments); hydrocarbon concentration was measured using a Rosemount model 400A hydrocarbon analyzer. The results of the experiment are shown in FIGS. 2 and 3.

The addition of tin oxide to Catalyst D, prepared according to the procedure of Example 3, did not influence the CO conversion activity as compared to the reference Catalyst C (without tin oxide). The results of the experiment show that both catalysts achieve an equal reduction in CO outlet concentration by means of the water-gas shift reaction (FIG. 2). The tin oxide-containing catalyst, Catalyst D; however, produces less than 100 ppm of methane whereas the reference catalyst, Catalyst C, produces more than 2,000 ppm of methane at 400° C. (FIG. 3).

EXAMPLE 5

Preparation of Platinum-Based Catalysts on a Cerium Oxide Support Impregnated with Tin Oxide [Catalyst E and Catalyst F]

Catalyst E (2 wt. % Platinum and 0.5 wt. % Tin Oxide)

50 g of coprecipitated cerium oxide-zirconia material (containing 29.5% CeO$_2$, 7.8% Nd$_2$O$_3$ and 7.1% Pr$_6$O$_{11}$)

was suspended in water (250 mL). 9.1 g of Pt-nitrate solution (containing 12.05 wt. % Pt) was added with stirring. The stirred suspension was heated to 70° C. After 45 minutes 0.2 g tin powder was added to the suspension. After 15 minutes of stirring, ammonia (1:2 diluted with water) was added until the pH reached 9. The suspension was filtered and the powder washed with water (500 mL). The resulting material was dried at 120° C. (8 h) and calcined at 500° C. (4 h).

Catalyst F (2 wt. % Platinum and 0.5 wt. % Tin Oxide)

Coprecipitated cerium oxide-zirconia material (50 g, containing 29.5% $CeO_2$, 7.8% $Nd_2O_3$ and 7.1% $Pr_6O_{11}$) was impregnated to incipient wetness with a solution of 5.91 g amine-solubilized platinum hydroxide (containing 16.9% Pt) diluted with water to a total volume of 24 mL. The material was dried at 120° C. (8 h) and calcined at 500° C. (4 h). The resulting powder was impregnated again with a solution of 0.34 g tin oxalate in 20 mL water and 5 mL nitric acid (69%) to incipient wetness. The resulting material was dried and calcined as before.

EXAMPLE 6

Effect of Catalyst Preparation on Catalyst Performance

The effect of the method of dispersing the tin on the catalyst support was determined by comparing the catalyst performance of Catalysts E and F (comparative).

Figure 4:
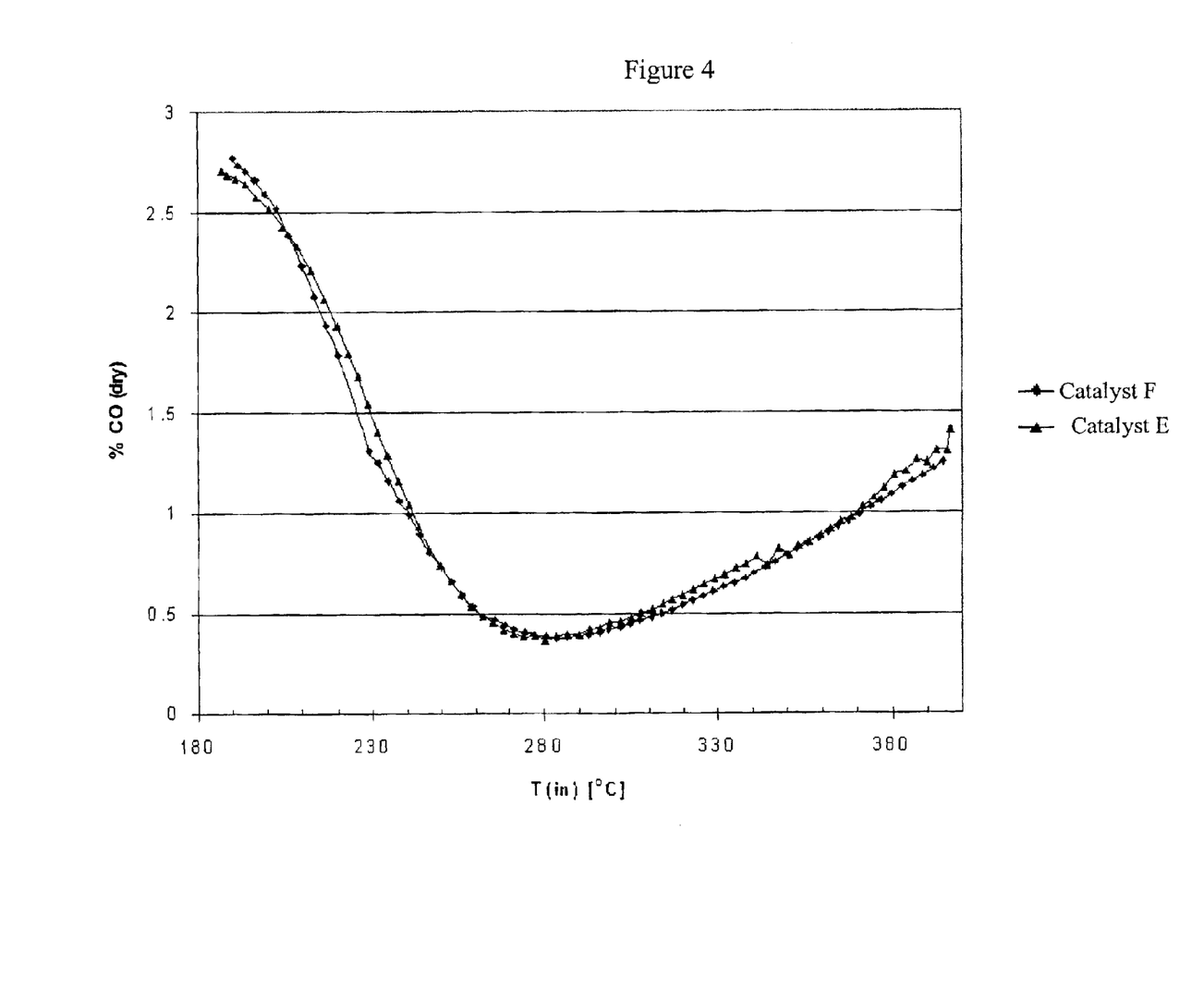
FIG. 4 is a graphical representation of the relationship of reaction temperature and catalytic activity for powdered platinum-based catalysts containing 0.5 wt. % $SnO_2$.
Figure 5:
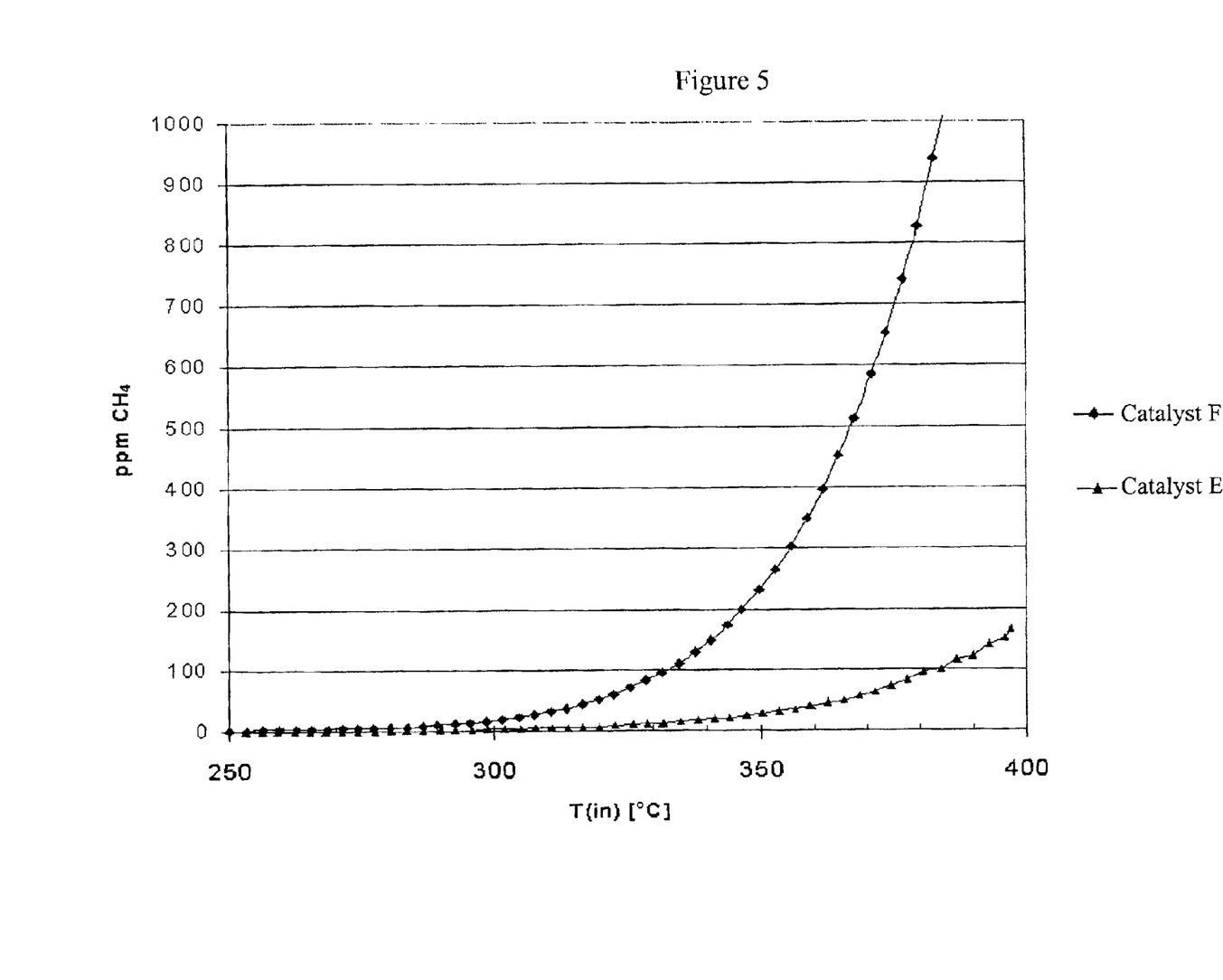
FIG. 5 is a graphical representation of the relationship of temperature and the amount of methane for powdered platinum-based catalysts containing 0.5 wt. % $SnO_2$.

Catalytic activities of the powders were measured using 2 g each of the powdered catalysts E and F in a 1" tube quartz reactor. The reactant (input) gas had a dry gas composition of 3% CO, 15% $CO_2$, 48% $H_2$, and 34% $N_2$. Steam (26%) was added to the reactant gas. The reactant gas was passed over the catalyst at a dry flow-rate of 0.5 L/min (which corresponds to a WHSV of 20,000 $h^{-1}$ wet gas). The CO outlet concentration was monitored using a non-dispersive infrared (NDIR) analyzer (Model ZRF California Analytical Instruments); hydrocarbon concentration was measured using a Rosemount model 400A hydrocarbon analyzer. The results of the experiment are shown in FIGS. 4 and 5.

Inspection of the figures reveals that while the catalysts possessed nearly identical CO conversion activities (FIG. 4), catalyst F produced significantly higher levels of methane at temperatures above 300° C. (FIG. 5). In addition, the production of methane became significantly more pronounced with increasing temperature for Catalyst F. These results show that the method of dispersing the tin oxide on the support has a significant impact on the ability of the catalysts to catalyze the water-gas shift reaction without significant production of methane.

EXAMPLE 7

Preparation of Powdered Catalysts with Various Concentrations of Tin Oxide 100 g of coprecipitated cerium oxide-zirconia material (containing 29.5% $CeO_2$, 7.8% $Nd_2O_3$ and 7.1% $Pr_6O_{11}$) was suspended in water (500 mL). 18.26 g of platinum nitrate solution (12.05 wt. % Pt) was added with stirring (The pH of the suspension was below 2 due to excess nitric acid in the reagent platinum nitrate solution). The stirred suspension was heated to 70° C. After 45 minutes, the suspension was divided into four equal parts. Part one was filtered, washed with water (500 mL), dried at 120° C. (8 h) and calcined at 500° C. (4 h). The resulting powder is designated as Catalyst G.

To parts 2–5, varying amounts tin powder were added to each suspension as specified in Table 1 (below).

After 15 minutes of stirring, ammonium hydroxide (1:2 diluted with water) was added until the pH reached 9. The suspended solid was filtered, washed with water (500 mL), dried at 120° C. (8 h) and calcined at 500° C. (4 h).

Each of the catalysts contained 2 wt. % of platinum and varying levels of tin oxide shown in Table 4. The powdered material used to prepare Catalyst D in Example 3 is also shown in Table 4.

TABLE 4

| Catalyst | wt. % of $SnO_2$ |
|---|---|
| Catalyst G | 0 g |
| Catalyst H1 | 0.07 wt. % |
| Catalyst H2 | 0.14 wt. % |
| Catalyst H3 | 0.32 wt. % |
| powder from Catalyst D | 0.50 wt. % |

EXAMPLE 8

Catalyst Performance of Powdered Catalysts G, H1, H2, H3 and D

The effect of varying concentrations of tin oxide on the catalyst performance of powdered platinum-based catalysts were determined in this example.

Catalytic activities of the powders are measured using 2 g portions of each of the powders from Example 7 in a quartz reactor. The reactant (input) gas had a dry gas composition of 3% CO, 15% $CO_2$, 48% $H_2$, and 34% $N_2$. Steam (26%) was added to the reactant gas. The reactant gas was passed over the catalyst at a dry flow-rate of 0.5 L/min (which corresponds to a WHSV of 20,000 $h^{-1}$ wet gas). The CO outlet concentration was monitored using a non-dispersive infrared (NDIR) analyzer (Model ZRF California Analytical Instruments); hydrocarbon concentration was measured using a Rosemount model 400A hydrocarbon analyzer. The results of the experiment are shown in Table 5. The T(50% conversion) is the temperature at which 50 percent of the carbon monoxide from the reactant gas stream is converted to $CO_2$.

TABLE 5

| Sample # | wt. % of $SnO_2$ | ppm $CH_4$ @ 350° C. | T (50% conv.) |
|---|---|---|---|
| Catalyst G | 0 wt. % | 976 | 210 |
| Catalyst H1 | 0.07 wt. % | 483 | 219 |
| Catalyst H2 | 0.14 wt. % | 260 | 219 |
| Catalyst H3 | 0.32 wt. % | 102 | 221 |
| Catalyst D | 0.50 wt. % | 28 | 229 |

EXAMPLE 9

Preparation of Gallium Oxide Impregnated Platinum-Based Powdered Catalyst

Coprecipitated cerium oxide-zirconia support material (10 g, containing 29.5% $CeO_2$, 7.8% $Nd_2O_3$ and 7.1% $Pr_6O_{11}$) was impregnated to incipient wetness with a mixture of: (1) platinum nitrate (1.66 g of a 12.05% Pt solution); (2) gallium nitrate solution having a volume of either (a) 0.214 mL or (b) 1.07 mL of a 0.5 M solution of gallium nitrate (Aldrich Chemical Company, Inc.); and (3) water to a total volume of 4.5 mL. The resulting powder was dried at 120° C. for 8 h and calcined at 500° C. for 4 h. Each of the resulting catalysts contained 2 wt. % platinum and were designated as follows (Table 6):

TABLE 6

| Catalyst | wt. % of Gallium Oxide (Ga$_2$O$_3$) |
| --- | --- |
| Catalyst G (Example 7) | 0 wt. % |
| Catalyst J1 | 0.1 wt. % |
| Catalyst J2 | 0.5 wt. % |

EXAMPLE 10

Catalyst Performance of Powdered Catalysts G, H1, H2, H3 and D

Catalytic activities of the powders were measured using 2 g of each of the powders in a quartz reactor. The reactant (input) gas had a dry gas composition of 3% CO, 15% CO$_2$, 48% H$_2$, and 34% N$_2$. Steam (26%) was added as a diluent to the reactant gas. The reactant gas was passed over the catalyst at a dry flow-rate of 0.5 L/min (which corresponds to a WHSV of 20,000 h$^{-1}$ wet gas). The CO outlet concentration was monitored using an non-dispersive infrared (NDIR) analyzer (Model ZRF California Analytical Instruments); hydrocarbon concentration was measured using a Rosemount model 400A hydrocarbon analyzer. The results of the experiment are shown in Table 7.

TABLE 7

| Catalyst | wt. % of Ga$_2$O$_3$ | ppm CH$_4$ @ 350° C. | T (50% conv.) |
| --- | --- | --- | --- |
| Catalyst G | 0 wt. % | 976 | 210 |
| Catalyst J1 | 0.1 wt. % | 430 | 219 |
| Catalyst J2 | 0.5 wt. % | 44 | 240 |

What is claimed:

1. A method of producing hydrogen from an input gas stream comprising carbon monoxide and steam, comprising: contacting the input gas stream with a catalyst comprising:
   an inorganic oxide support;
   a platinum group metal dispersed on the inorganic oxide support; and
   a methane suppressing component selected from the group consisting of oxides of gallium, oxides of tin and combinations thereof, wherein the methane suppressing component is dispersed on the inorganic oxide support.

2. The method of claim 1, wherein the platinum group metal is selected from the group consisting of platinum, palladium, rhodium, ruthenium and iridium.

3. The method of claim 2, wherein the platinum group metal is platinum.

4. The method of claim 1, wherein there is from about 0.1 to 10 wt. % of the platinum group metal dispersed on the inorganic oxide support.

5. The method of claim 1, wherein the methane suppressing component is one or more oxides of tin and there is from about 0.1 to 15 wt % of oxides of tin dispersed on the inorganic oxide support.

6. The method of claim 1, wherein the methane suppressing component is one or more oxides of gallium and there are from 0.1 to 5 wt. % of oxides of gallium dispersed on the inorganic oxide support.

7. The method of claim 1, wherein the inorganic oxide support is selected from the group consisting of alumina, zirconia, titania, silica, oxides of rare earth metals and combinations thereof, wherein the rare earth metals are selected from the group consisting of the lanthanides and yttrium.

8. The method of claim 7, wherein the inorganic oxide support is a composite of zirconia and oxides of one or more rare earth metals selected from the group consisting of the lanthanides and yttrium.

9. The method of claim 8, wherein the inorganic oxide support is a cerium oxide-zirconia composite.

10. The method of claim 1, wherein the inorganic oxide support is alumina impregnated with one or more oxides of the rare earth metals selected from the group consisting of the lanthanides and yttrium.

11. The method of claim 1, wherein the inorganic oxide support is alumina impregnated with zirconia and one or more oxides of the rare earth metals selected from the group consisting of the lanthanides and yttrium.

12. The method of claim 1, wherein the catalyst is in the form of a washcoat composition deposited on a substrate.

13. The method of claim 12, wherein the substrate is a honeycomb monolith.

14. The method of claim 1, wherein the input gas stream further comprises at least 10% by volume of hydrogen.

15. A method of producing hydrogen from an input gas stream comprising carbon monoxide and steam, comprising: contacting the input gas stream with a catalyst comprising:
   a cerium oxide-zirconia support;
   about 0.01 to 10 wt. % of platinum dispersed on the cerium oxide-zirconia support; and
   about 0.01 to 5 wt % of oxides of tin dispersed on the cerium oxide-zirconia support.

16. The method of claim 15, wherein there is
   about 1 to 5 wt. % platinum dispersed on the cerium oxide-zirconia support; and
   about 0.1 to 2 wt % of oxides of tin dispersed on the cerium oxide-zirconia support.

17. The method of claim 15, wherein the catalyst is in the form of a washcoat composition deposited on a substrate.

* * * * *